United States Patent [19]

Iijima

[11] Patent Number: 5,202,922
[45] Date of Patent: Apr. 13, 1993

[54] DATA COMMUNICATION SYSTEM

[75] Inventor: Yasuo Iijima, Yokohama, Japan

[73] Assignee: Kabushiki Kaisha Toshiba, Kawasaki, Japan

[21] Appl. No.: 798,757

[22] Filed: Nov. 29, 1991

[30] Foreign Application Priority Data

Nov. 30, 1990 [JP] Japan ................................. 2-340428

[51] Int. Cl.$^5$ .............................................. H04L 9/02
[52] U.S. Cl. .......................................... 380/45; 380/21; 380/22; 380/23
[58] Field of Search ....................... 380/21, 23, 24, 25, 380/43, 44, 45, 22

[56] References Cited

U.S. PATENT DOCUMENTS

| 4,799,061 | 1/1989 | Abraham et al. | 380/23 |
| 4,876,716 | 10/1989 | Okamoto | 380/21 |
| 4,888,800 | 12/1989 | Marshall et al. | 380/21 |
| 4,933,971 | 6/1990 | Bestock et al. | 380/44 |
| 5,109,152 | 4/1992 | Takagi et al. | 380/23 |

Primary Examiner—Tod Swann
Attorney, Agent, or Firm—Cushman, Darby & Cushman

[57] ABSTRACT

When a final session is performed between a host device and an IC card, common key data stored in the host device is encrypted by an updated session key and transmitted to the IC card in which the encrypted common key data is decrypted by the the same updated session key to obtain the common key data which is stored in the IC card for the following sessions to be performed later.

14 Claims, 4 Drawing Sheets

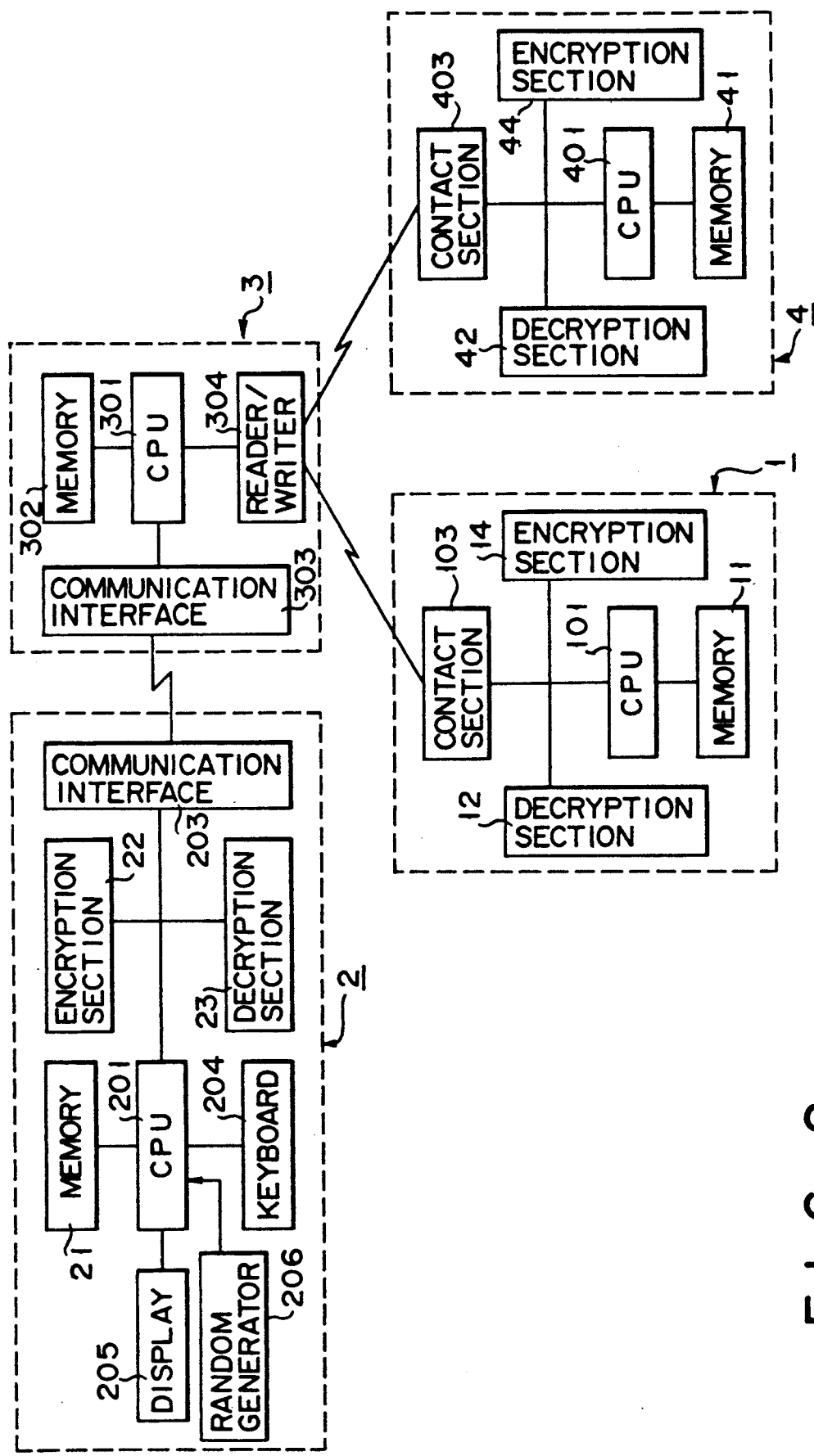
F I G. 2

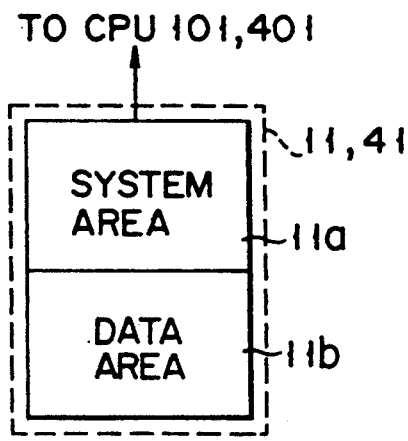
F I G. 3
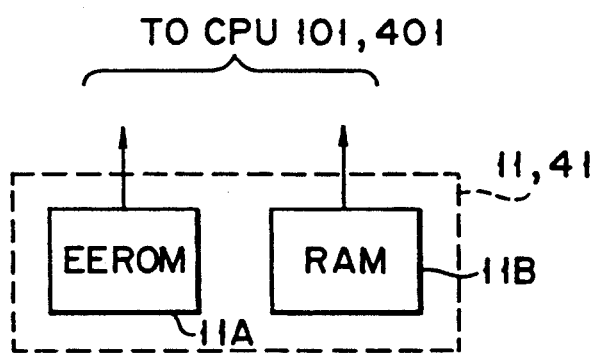
F I G. 4

DATA COMMUNICATION SYSTEM

BACKGROUND OF THE INVENTION

1. Field of the Invention

The present invention relates to a data communication system using a session key in the transaction executed between, for example, a host device and a plurality of IC cards.

2. Description of the Related Art

Conventionally, in a data communication system including a host device, a terminal, and the like, data was encrypted using predetermined key data (session key data) and the encrypted data was transmitted in order to enhance the security of the data. To make the security much higher, a method of encrypting the session key data and transmitting the encrypted session key data, has recently been proposed. A preceding session key, which has been used once, can be practically used again as an encrypting/decrypting key for transmission of current session key data. No problems will occur in this case if two apparatuses for sending and receiving the data are fixed or predetermined. In the transaction executed between one host device and a plurality of IC cards, however, the final session keys for the respective IC cards must be all stored on the host device side for succeeding transactions.

A memory device for storing all the final session keys is needed and therefore a burden of the host device is increased.

SUMMARY OF THE INVENTION

It is accordingly an object of the present invention to provide a data communication system using a session key and removing a burden from a host device.

According to the present invention, there is provided a data communication system for communicating data between first and second electronic apparatuses, the first electronic apparatus comprising:

first memory means for storing common key data;

session key data generating means for generating session key data for each session;

first encrypting means for encrypting the session key data using the common key data; and first transmitting means for transmitting data encrypted by the first encrypting means to the second electronic apparatus;

the second electronic apparatus comprising:

second memory means for storing the common key data;

decrypting means for decrypting encrypted session key data received from the first electronic apparatus using the common key data;

second encrypting means for encrypting second communication data to be transmitted to the first electronic apparatus using the session key data;

second transmitting means for transmitting the second communication data encrypted by the second encrypting means to the first electronic apparatus; and updating means for updating the common key data stored in the second memory means to the session key data decrypted by the decrypting means, wherein the key data generated by the key data generating means is transmitted to the second electronic apparatus every time a session of data is performed between the first and second electronic apparatuses.

A host device and an electronic apparatus such as IC cards store predetermined session key data, and hold it as a key for encrypting/decrypting the same transmission data obtained in respective sessions. After the final session, the session key is encrypted and transmitted from the host device to the IC cards using the transmission data, and then decrypted and held on the IC card side.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a block diagram showing the data communication system shown in FIGS. 1A and 1B;

FIG. 3 is a block diagram specifically showing a memory used in the data communication system shown in FIG. 2; and FIG. 4 is a block diagram showing another example of the memory shown in FIG. 3.

DETAILED DESCRIPTION OF THE PREFERRED EMBODIMENTS

Figure 1A:
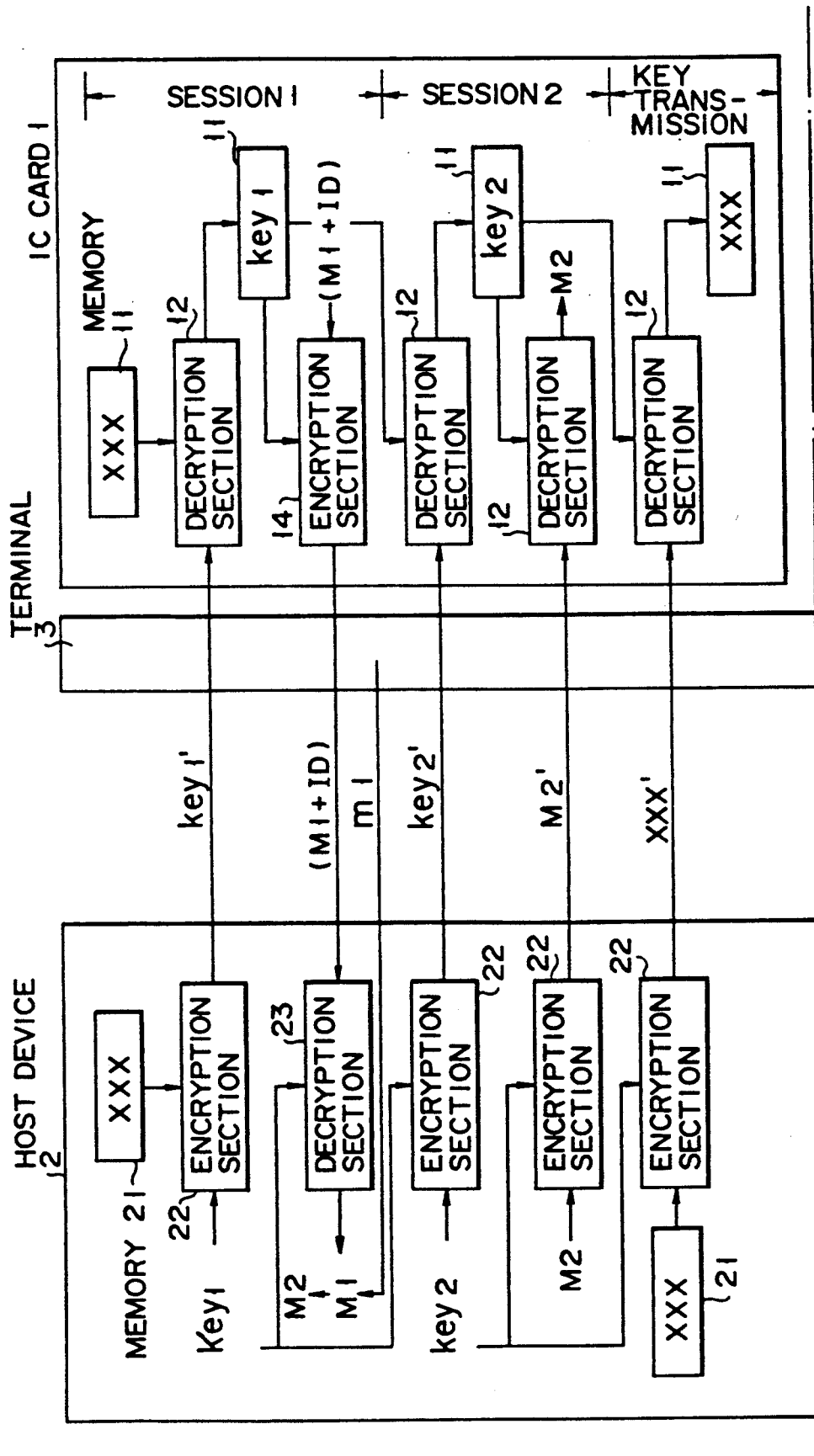
FIGS. 1A and 1B are block diagrams functionally showing an arrangement of a data communication system according to an embodiment of the present invention.

An embodiment of the present invention in which a data communication system using a session key is applied to a system including a host device, a terminal and IC cards, will be described in detail with reference to the accompanying drawings.

An arrangement of the data communication system according to the embodiment of the present invention will be described with reference to FIG. 2. A host device 2 comprises a CPU 201 for controlling the operations of components constituting the host device 2, a nonvolatile memory 21 for storing various types of information including programs for operations of the CPU 201, a communication interface 203 communicating with a terminal 3, a keyboard 204 by which a user inputs data, instructions, and the like, a display 205 such as a CRT for displaying a result of calculation, transmitted data, and the like, a random number generator 206 for generating random number data for encrypting data to be transmitted, an encrypting module 22 (hereinafter referred to as an encrypting section) for encrypting data to be transmitted, and a decrypting module 23 (hereinafter referred to as a decrypting section) for decrypting data to be received.

The terminal 3 comprises a CPU 301 for controlling the operations of components constituting the terminal 3, a memory 302 for storing various types of information, a communication interface 303 communicating with the host device 2, and a reader/writer 304 for reading/writing data from/to IC cards 1 and 4.

The IC cards 1 and 4 comprise CPUs 101 and 401 for controlling the operations of components constituting the IC cards 1 and 4, nonvolatile memories 11 and 41 for storing various types of information, contact portions 103 and 403 for electrically connecting the IC card 1 or 4 with the reader/writer 304, encrypting sections 14 and 44 for encrypting data to be transmitted, and decrypting sections 12 and 4 for decrypting data to be received, respectively.

The memory 11 of the IC card 1 includes a system area 11a and a data area 11b, as shown in FIG. 3. The system area 11a can be accessed by the CPU 101 only and stores a program, and the data area 11b stores resultant data of transaction as a working memory. The memory 41 of the IC card 4 has the same structure and functions as those of the memory 11 of the IC card 1.

Figure 1B:
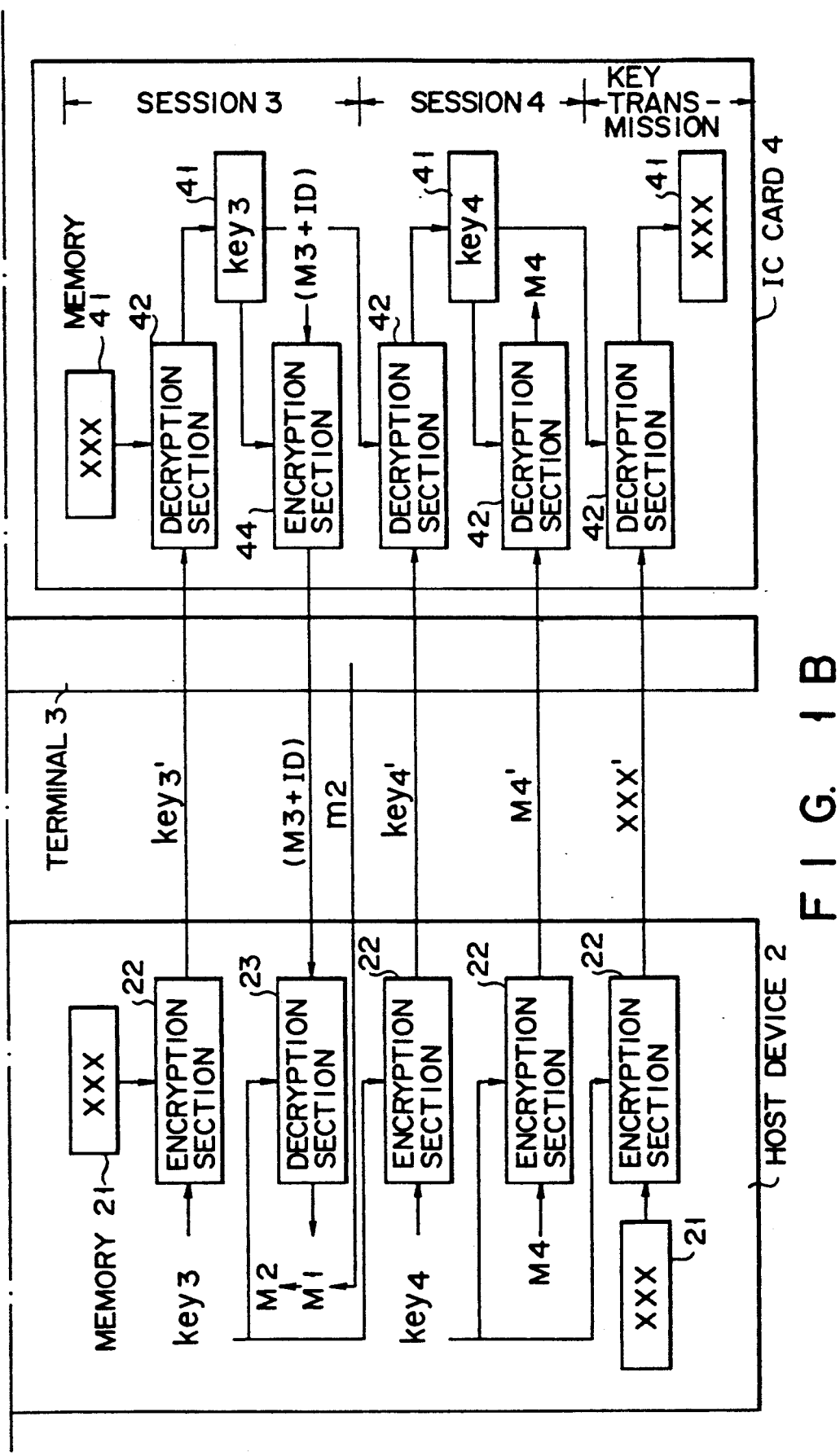

FIGS. 1A and 1B show a flow chart of data processing in a case where data stored in the memory 11 of the IC card 1 is read out by the terminal 3 and updated by the host device 2, and the updated data is transmitted to the IC card 1.

In the data communication system described above, it is predetermined to use data "xxx" as a transmission session key. In the data processing shown in FIGS. 1A and 1B, the IC card 1 is inserted into the reader/writer 304 of the terminal 3 to communicate with the host device 2. The IC card 1 and host device 2 are provided with the nonvolatile memories 11 and 21, respectively, and a predetermined transmission session key xxx is stored in these memories 11, 21 at the first stage, e.g., when the IC card 1 is shipped from a factory or when the IC card 1 is issued to a user at a bank, for example. The transmission session key xxx is also stored in the nonvolatile memory 41 of the IC card 4.

If the IC card 1 is inserted to the reader/writer 304 of the terminal 3 and is enabled to communicate with the host device 2 through the terminal 3, first session key data "key 1" generated from the random number generator 206 arranged in the host device 2 is encrypted by the encrypting section 22 using the transmission session key data "xxx" as an encrypting key. The encrypted session key data "key 1'" is transmitted to the IC card 1 via the terminal 3 and then decrypted in the decrypting section 12 using the transmission session key data "xxx" which is read out from the system area 11a of the memory 11, shown in FIG. 3, by means of the CPU 101, thereby taking out the first session key data key 1. After that, the transmission session key "xxx" stored in the system area 11a is rewritten as the first session key data "key 1".

When transaction is performed using the IC card 1, data M1 stored in the data area 11b of the memory 11 in the IC card 1 is read out and transmitted to the host device 2, together with card identification data (ID) of the IC card 1 stored in the system area 11a. The data M1 and card ID are encrypted in the encrypting section 14 using the first session key data "key 1" stored in the system area 11a of the memory 11 as an encrypting key, and the encrypted data (MI+ID)' is then transmitted to the host device 2. As described above, in the IC card 1, the data (M1+ID)' encrypted using first session key data "key 1" received from the host device 2 is transmitted to the host device 2. Even though the encrypted data is received by a third party between the terminal 3 and the host device 2, the third party who does not have the first session key data "key 1" cannot decrypt the data. The encrypted data (MI+ID)' is decrypted using the first session key data "key 1" in the decrypting section 23 in the host device 2, and the data M1 and card ID are taken out. The card ID is compared with ID data registered beforehand in the host device 2 to verify the card 1. When the card 1 is verified, the data M1 is calculated using transaction data ml input from the terminal 3 of, e.g., POS (point of sales) to obtain updated data M2. The operation of the first session "session 1" is thus ended.

Subsequently, the operation of the second session "session 2" is started. The second session key data "key 2" generated from the random number generator 206 is encrypted by the encrypting section 22 using the first session key data "key 1" as an encrypting key, and the encrypted session key data "key 2'" is transmitted to the IC card 1. In the IC card 1, the encrypted session key data "key 2'" is decrypted in the decrypting section 12 using the first session key data "key 1" stored in the system area 11a as a decrypting key, and then the second session key data "key 2" is taken out. After that, the first session key data "key 1" stored in the system area 11a is rewritten as the second session key data "key 2".

The data M2 updated in the host device 2 is encrypted in the encrypting section 22 using the second session key data "key 2". The encrypted updated data M2' is sent to the IC card 1 and decrypted in the decrypting section 12 using the second session key data "key 2" read out from the system area 11a. In the IC card 1, the updated data M2 is stored in the data area 11b. The operation of the second session "session 2" is thus ended. As described above, the session keys stored in the memory 11 of the IC card are sequentially rewritten every session. Even though the encrypted data is received by a third party halfway in each session, the data cannot be decrypted and therefore the security of transaction is maintained.

When the operation of the subsequent session is not performed in the IC card 1, the transmission session key "xxx" is transmitted from the host device 2 to the IC card 1, and data processing is completed. If the completion of the session is detected on the host device 2 side, the key "xxx" stored in the nonvolatile memory 21 is read out and encrypted in the encrypting section 22 using the second session key data "key 2" as an encrypting key. An encrypted transmission session key "xxx'" is transmitted to the decrypting section 12 of the IC card 1. It can be decrypted only by the IC card 1 in which the second session key data "key 2" used in the previous second session (session 2) is held in the system area 11a. The decrypted transmission session key "xxx" is stored in the system area 11a of the memory 11 to perform the operation of the next session.

Third and fourth Sessions (session 3 and session 4) between the host device 2 and IC card 4 will be described by referring to FIG. 1B. As described above, the transmission session key "xxx" is stored in advance in the system area of the nonvolatile memory 41 of the IC card 4. If the IC card 4 is inserted into the terminal 3 and data can be received and transmitted between the host device 2 and IC card 4, a third session key data "key 3" generated from the random number generator 206 is encrypted by the key "xxx" and transmitted to the decrypting section 42 of the IC card 4. The decrypted key, "key 3", is stored in the system area of the memory 41 and used as an encrypting key for encrypting the data M3 and card ID read out from the data area of the memory 41. The data M3 and card ID are encrypted by the "key 3" key in the encrypting section 44 and then transmitted to the host device 2. The data M3 is calculated using transaction data m2 input from, e.g., the terminal 3, and updated data, for example, new balance data M4 is generated. The operation of the third session "session 3" is thus ended.

The operation of the fourth session (session 4) is then started. In the fourth session, the fourth session key "key 4" generated from the random number generator 206 is encrypted in the encrypting section 22 using the third session key "key 3" as an encrypting key, and the encrypted session key "key 4'" is transmitted to the IC card 4. In the IC card 4, the encrypted session key "key 4'" is decrypted in the decrypting section 42 using the third session key "key 3" stored in the system area of the memory 41 as a decrypting key, and the fourth session key "key 4" is taken out. The fourth session key "key 4" is stored in the system area of the memory 41 in place of the third session key "key 3".

The data M4 updated by the host device 2 is encrypted in the encrypting section 22 using the key "key 4", and the encrypted data M4' is transmitted to the IC card 4 and then decrypted in the decrypting section 42 using the key "key 4" stored in the system area of the memory 41. The operation of the fourth session (session 4) is thus ended.

If it is confirmed that the subsequent session is not executed, the transmission session key "xxx" is read out from the memory 21 of the host device 2 and encrypted in the encrypting section 22 using the fourth session key "key 4". The encrypted transmission session key "xxx'" is transmitted to the IC card 4, then decrypted in the decrypting section 42 using the key "key 4", and stored in the system area of the memory 41.

In the above embodiment, as shown in FIG. 3, the memories 11 and 41 of the IC cards 1 and 4 include the system area 11a which can be accessed by the CPU 101 or 401 only and the data area 11b used as a working memory. However, the present invention is not limited to these memories 11 and 41. For example, as shown in FIG. 4, the memories 11 and 41 can be constituted so as to include an EEPROM 11A which can be accessed by the CPU 101 only and a RAM 11B used as a working memory, respectively.

As described above, according to the present invention, a single host device constitutes an on-line system using a plurality of IC cards and a session key common to the IC cards is stored in the respective IC cards. Therefore, a burden of the host device can greatly be lessened.

Additional advantages and modifications will readily occur to those skilled in the art. Therefore, the invention in its broader aspects is not limited to the specific details, representative devices, shown and described herein. Accordingly, various modifications may be made without departing from the spirit or scope of the general inventive concept as defined by the appended claims and their equivalents.

What is claimed is:

1. A data communication system comprising:
   first and second electronic apparatuses for transmitting data to each other during data exchange sessions;
   said first electronic apparatus comprising:
     first memory means for storing common key data;
     session key data generating means for generating session key data for each of said data exchange sessions;
     first encrypting means for encrypting said session key data using said common key data to generate first encrypted data;
     first transmitting means for transmitting said first encrypted data encrypted by said first encrypting means to said second electronic apparatus; and
     first decrypting means for decrypting a second encrypted data which is encrypted second data transmitted from said second electronic apparatus using said session key data;
   said second electronic apparatus, comprising:
     second memory means for storing said common key data;
     second decrypting means for decrypting first encrypted data received from said first electronic apparatus using said common key data to obtain session key data;
     second encrypting means for encrypting said second data using said session key data to generate second encrypted data to be transmitted to said first electronic apparatus;
     second transmitting means for transmitting said second encrypted data encrypted by said second encrypting means to said first electronic apparatus; and
     first updating means for updating said common key data stored in said second memory means to said session key data decrypted by said second decrypting means; and
   portions of said first and second electronic apparatuses together constituting second updating means for updating updated session key data stored in said second memory means by using said common key data stored in said first memory means after a predetermined data exchange session is completed;
   said key data generated by said session key data generating means being transmitted to said second electronic apparatus every time one of said data exchange sessions is performed.

2. The data communication system according to claim 1, wherein said session key data generating means comprises a random number generator.

3. The data communication system according to claim 1, wherein said first electronic apparatus comprises a host device, and said second electronic apparatus comprises a plurality of IC cards.

4. The data communication system according to claim 1, wherein said second electronic apparatus comprises a CPU for controlling said second electronic apparatus, and said second memory means includes a memory area accessible by said CPU only.

5. The data communication system according to claim 1, wherein said second electronic apparatus comprises a CPU for controlling an operation of said second electronic apparatus, and said second memory means includes an EEPROM accessible by said CPU only.

6. A data communication system comprising:
   first and second electronic apparatuses for transmitting data to each other during data exchange sessions;
   said first electronic apparatus comprising:
     first memory means for storing common key data;
     session key data generating means for generating session key data for each of said data exchange sessions;
     first encrypting means for encrypting said session key data using said common key data; and
     first transmitting means for transmitting data encrypted by said first encrypting means to said second electronic apparatus;

said second electronic apparatus comprising:
second memory means for storing said common key data;
decrypting means for decrypting encrypted session key data received from said first electronic apparatus using said common key data;
second encrypting means for encrypting second communication data to be transmitted to said first electronic apparatus using said session key data;
second transmitting means for transmitting said second communication data encrypted by said second encrypting means to said first electronic apparatus; and
updating means for updating said common key data stored in said second memory means to said session key data decrypted by said decrypting means;
said key data generated by said key data generating means is transmitted to said second electronic apparatus every time one of said data exchange sessions is performed;
said first electronic apparatus further comprising:
means for encrypting said common key data stored in said first memory means by using said session key data; and
means for transmitting said common key data encrypted by said encrypting means to said second electronic apparatus when a predetermined data exchange session is completed.

7. The data communication system according to claim 6, wherein said second electronic apparatus comprises means for decrypting the encrypted common key data encrypted and transmitted by said first electronic apparatus using the session key data.

8. The data communication system according to claim 6, comprising updating means for updating updated session key data stored in said second memory means to the common key data decrypted by said decrypting means after a predetermined data exchange session is ended.

9. The data communication system according to claim 6, wherein said session key data generating means comprises a random number generator.

10. The data communication system according to claim 6, wherein said first electronic apparatus comprises a host device, and said second electronic apparatus comprises a plurality of IC cards.

11. The data communication system according to claim 6, wherein said second electronic apparatus comprises a CPU for controlling said second electronic apparatus, and said second memory means includes a memory area accessible by said CPU only.

12. The data communication system according to claim 6, wherein said second electronic apparatus comprises a CPU for controlling an operation of said second electronic apparatus, and said second memory means includes an EEPROM accessible by said CPU only.

13. The data communication system according to claim 6, wherein said first electronic apparatus further comprises second decrypting means for decrypting the second communication data using said session key data, the second communication data being encrypted by said second encrypting means and transmitted from said second electronic apparatus.

14. A data communication system for communicating data between first and second electronic apparatuses;
said first electronic apparatus comprising:
first memory means for storing common key data;
session key data generating means for generating session key data for each session;
first encrypting means for encrypting the common key data stored in said first memory means by using the session key data;
second encrypting means for encrypting said session key data using said common key data;
first transmitting means for transmitting data encrypted by said second encrypting means to said second electronic apparatus; and
second transmitting means for transmitting the common key data encrypted by said first encrypting means to said second electronic apparatus, when a final session between said first and second electronic apparatuses is terminated;
said second electronic apparatus comprising:
second memory means for storing said common key data;
first decrypting means for decrypting encrypted session key data received from said first electronic apparatus using said common key data;
second decrypting means for decrypting the encrypted common key data encrypted and transmitted by said first electronic apparatus using the session key data;
third encrypting means for encrypting second communication data to be transmitted to the first electronic apparatus using said session key data;
third transmitting means for transmitting said second communication data encrypted by said third encrypting means to said first electronic apparatus;
first updating means for updating the common key data stored in said second memory means to the session key data decrypted by said second decrypting means; and
second updating means for updating updated session key data stored in said second memory means to the common key data decrypted by said second decrypting means after the final session is terminated.

* * * * *